United States Patent [19]

Yde

[11] Patent Number: 5,665,573
[45] Date of Patent: Sep. 9, 1997

[54] POLYMERIZATION OF LIGNIN AT ALKALINE PH

[75] Inventor: Birgitte Yde, Farum, Denmark

[73] Assignee: Novo Nordisk A/S, Bogsvaerd, Denmark

[21] Appl. No.: 347,358

[22] PCT Filed: Jul. 2, 1993

[86] PCT No.: PCT/DK93/00217

§ 371 Date: Dec. 1, 1994

§ 102(e) Date: Dec. 1, 1994

[87] PCT Pub. No.: WO94/01488

PCT Pub. Date: Jan. 20, 1994

[30] Foreign Application Priority Data

Jul. 2, 1992 [DK] Denmark ................... 0869/92
Aug. 20, 1992 [DK] Denmark ................... 1030/92

[51] Int. Cl.[6] ........................................ C12P 7/12
[52] U.S. Cl. ..................... 435/118; 527/400; 527/401
[58] Field of Search ..................... 530/200; 435/41, 435/127, 118; 527/400, 401

[56] References Cited

U.S. PATENT DOCUMENTS 4,432,921  2/1984  Haars et al. ............. 264/109

FOREIGN PATENT DOCUMENTS 0 275 544  12/1987  European Pat. Off. .
0 354 485  2/1990  European Pat. Off. .

OTHER PUBLICATIONS

Popp et al. "Incorporation of p–cResol into Lignins Via Peroxidase–Catalysed Copolymerization in Nonaqueous Media", Enzyme Microb. Technol., 1991, vol. 13, (Dec.).

*Primary Examiner*—Jeffrey C. Mullis
*Attorney, Agent, or Firm*—Steve T. Zelson, Esq.; James Harrington, Esq.

[57] ABSTRACT

The present invention relates to a method of enzymatic polymerization and/or modification of lignin or lignin containing materials. The invention also relates to the use of this method in the manufacture of wood composites or wood laminates.

11 Claims, 11 Drawing Sheets

POLYMERIZATION OF LIGNIN AT ALKALINE PH

CROSS-REFERENCE TO RELATED APPLICATIONS

This application is a national stage application of PCT/DK93/00217 filed Jul. 2, 1993, which is incorporated herein by reference.

TECHNICAL FIELD

The present invention relates to a method of enzymatic polymerization and/or modification of lignin or lignin containing materials. The invention also relates to the use of this method in the manufacture of wood composites or wood laminates.

BACKGROUND ART

Wood composites such as fibre board and particle board are made by binding the material (e.g. wood fibres or wood particles) with a suitable binder and pressing, usually with heating. Conventional chemical binders for this purpose are e.g. urea-formaldehyde resin and phenol-formaldehyde resin.

Binders made from enzymatically treated lignin are also known. Thus, it has been suggested to use a binder made from peroxidase treated lignin (vide e.g. U.S. Pat. No. 4,432,921), but the use of a peroxidase has not previously been demonstrated.

For wood composites, e.g. for use in construction, a high physical strength is generally important. In order to obtain high physical strength it is essential that an optimal polymerization/modification takes place during binding of the material.

As a liquid binder material is believed to be a prerequisite for optimal polymerization, enzymatic polymerization processes, due to the reaction pH of the enzymes hitherto employed, optionally involve the addition of organic solvents in order to solubilize lignin (vide e.g. EP Patent Application No. 354,485).

Another way of improving the strength of the composite board involves addition of chemical polymerization agents, e.g. polydiphenylmethyldiisocyanate (PMDI), (vide e.g. EP Patent Specification No. 275,544).

SUMMARY OF THE INVENTION

It is the object of this invention to provide a method of polymerization of lignin or lignin containing materials that allows for optimal polymerization/modification at elevated pH without need for organic solvents to be added.

We have now surprisingly found that peroxidases are able to polymerize lignin or lignin containing material at elevated pH values, by which there is no need for organic solvents to be added to the reaction mixture, provided the polymerization is conducted by a controlled addition of hydrogen peroxide during the reaction.

The invention provides a method of enzymatic polymerization/modification of lignin or lignin containing materials, the method being improved in respect of polymerization and exploitation of the lignin. Moreover, the method does not require the addition of organic solvents or chemical polymerization agents.

Due to the extent of the polymerization achieved by this method, it is especially advantageous for implementation in the manufacture of wood composites or laminated wood products of which high physical strength is required.

Accordingly, the invention provides a method of enzymatic polymerization and/or modification of lignin or lignin containing material by treatment of the lignin or lignin containing material with an aqueous solution of peroxidase at elevated pH values, and under a controlled addition of hydrogen peroxide, in the absence of organic solvents.

In another aspect, the invention provides a glue or active binder obtained by subjecting lignin sulphonate to the method of the invention.

In yet another aspect, the invention relates to the use of the method of the invention in the preparation of a glue or an active binder for use in the manufacture of wood composites e.g. wood fibre materials such as chipboards, fibre boards, or particle boards, or in the manufacture of laminated wood products, such as laminated beams and plywood.

BRIEF DESCRIPTION OF DRAWINGS

The present invention is further illustrated by reference to the accompanying drawings, in which:

FIG. 1A Standard: 4000 PODU/ml and 10 mM $H_2O_2$;

FIG. 1B Extra Enzyme: 2×4000 PODU/ml;

FIG. 1C Extra peroxide: 2×10 mM $H_2O_2$;

FIG. 1D 2×extra peroxide: 3×10 mM $H_2O_2$;

FIG. 2A: 10 PODU/ml;

FIG. 2B: 40 PODU/ml;

FIG. 2C: 400 PODU/ml;

FIG. 2D: 4000 PODU/ml;

FIG. 3A: Start;

FIG. 3B: 5 min;

FIG. 3C: 10 min;

FIG. 3D: 15 min;

FIG. 4A: Start;

FIG. 4B: 5 min;

FIG. 4C: 10 min;

FIG. 4D: 15 min; and

FIG. 5A: Indulin;

FIG. 5B: Lignin 6;

FIG. 5C: Lignin S;

FIG. 5D: Fichtenlignin 4;

FIG. 5E: Fichtenlignin 6;

FIG. 5F: Fichtenlignin 9.

DETAILED DISCLOSURE OF THE INVENTION

Figure 1A:
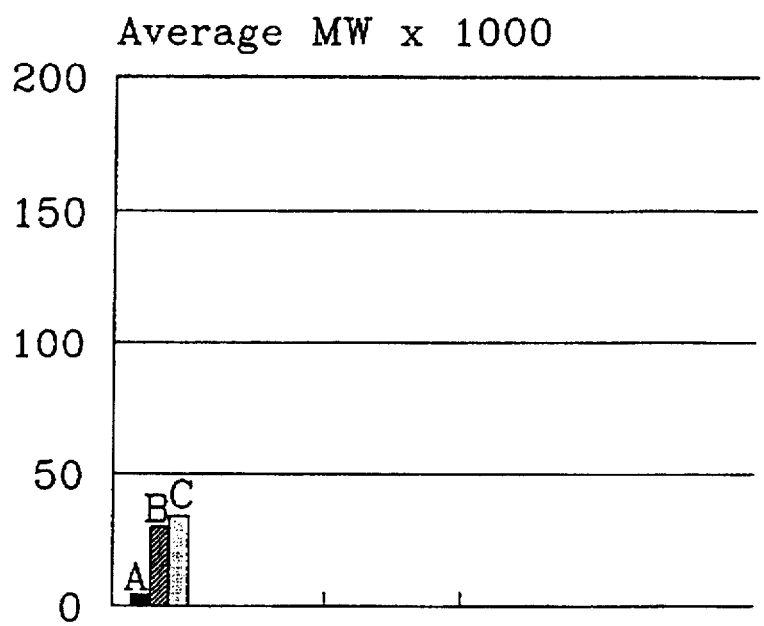
FIGS. 1A–1D shows polymerization of Indulin™, determined by average molecular weight (MW×1000), by use of SP 502™ (4000 PODU/ml) and 10 mM $H_2O_2$. (A Start; B 5 min; C 30 min; D 60 min; E 65 min; F 90 min)

The present invention provides a method of enzymatic polymerization of lignin or lignin containing materials, which method comprises the action of a peroxidase at elevated pH values and a controlled addition of hydrogen peroxide. The method provides an active binder that may be used in the manufacture of wood composites, or as glue in the manufacture of laminated wood products.

The Enzyme

According to the invention, it has now been found that peroxidases (EC 1.11.1.7), preferably the peroxidases derived from Coprinus, e.g. *C. cinerius* or *C. macrorhizus*, or Bacillus, e.g. *B. pumilus*, are superior to the enzymes hitherto used in enzymatic polymerization processes.

Surprisingly, and contrary to the enzymes hitherto used in enzymatic polymerization methods, it has turned out that peroxidases posses excellent polymerization even at highly alkaline pH values. At alkaline conditions lignin becomes water soluble, and, thus, there is no need to add organic solvents. The presence of a liquid binder material allows for maximal polymerization, leading to products of improved physical resistance. Moreover, a liquid binder, or at least a colloidal binder, is more easily dispensed through valves, nozzles or jets, usually employed in the manufacture of wood composites or laminated wood products.

The method shall be performed at alkaline conditions, i.e. pH 7–13. In particular alkaline conditions in which the enzyme possesses sufficient polymerization activity, i.e. pH 8–12 is preferred. In its most preferred embodiment, the method is performed at pH 9–11.

The amount of peroxidase should generally be in the range of 10–10,000 PODU per g of lignin or lignin containing material (PODU is a unit of peroxidase activity defined below).

Addition of Hydrogen Peroxide

The presence of hydrogen peroxide is essential to the action of peroxidases. A suitable amount of $H_2O_2$ will usually be in the range of 0.01–20 mM, preferably 1–10 mM.

However, in order to secure maximum performance of the enzyme and to avoid unintended degradation of the highly reactive and costly hydrogen peroxide, the addition of hydrogen peroxide should be conducted carefully throughout the incubation period.

Hydrogen peroxide may be added in separate portions (discretely), either primary in the initial stage of the incubation period, or equally throughout the incubation period. Hydrogen peroxide may also be added continuously, either primary in the initial stage of the incubation period, or equally throughout the incubation period.

The addition of hydrogen peroxide may be conducted manually or automatically, e.g. by use of a pump.

In another embodiment, addition of hydrogen peroxide may be conducted enzymatically by use of a hydrogen peroxide generating enzyme in the presence of its substrate, e.g. a glucose oxidase. The addition of hydrogen peroxide can also take place using a chemical substance that liberates hydrogen peroxide.

Peracids may replace hydrogen peroxide in the process of the invention.

Lignin Containing Materials

The method of the invention finds application on lignin and/or lignin containing materials, e.g. lignocellulosic material. The lignin may be sulfonated or non-sulfonated.

Lignin or lignin containing materials are obtainable as byproducts from the pulping industry. Indulin, Lignin 6, Lignin S, Fichtenlignin 4, Fichtenlignin 6, Fichtenlignin 9, and Black Liquor are trade marks of lignin products, obtainable from various paper mills.

Incubation

The enzyme reaction emanates from an aqueous solution of the enzyme, into which the lignin or lignin containing material is immersed. The presence of water is essential to the enzymatic reaction. Furthermore, the amount of water should be the amount sufficient to attain a suitable liquid or colloidal binder material, and it is typically in the range of 1–10 times the weight of lignin. At alkaline conditions, however, lignin becomes more easily solubilized, thereby making it possible to attain a liquid or at least a colloidal binder material with less water.

Organic solvents, either water miscible or water immiscible, may be present during incubation, but are, however, not required. The method of this invention is carried out essentially without any organic solvents present, or in the presence of minor amounts of organic solvents. In the context of this invention, essentially without any organic solvents present indicates less than 5% w/w, preferably less than 2%, most preferred less than 1%w/w of organic solvents present. In a more specific embodiment, the method is carried out in the absence of organic solvents. Higher concentrations of organic solvents may hamper the enzyme performance, the reason why it is recommended to immobilize the enzyme.

Also the presence of chemical polymerizing agents, e.g. polydiphenylmethanediisocyanate (PMDI), is not a prerequisite of the present invention. The method of the invention may, therefore, be carried out in the presence of a chemical polymerizing agent.

The incubation may be performed at temperatures in the range of 20°–90° C., preferably 20°–70° C., and for a period of from 1 minute to several days, preferably 5 minutes to 5 hours, depending on the stability of the particular enzyme.

Peroxidase Activity

One peroxidase unit (PODU) is defined as the amount of enzyme which, under standard conditions (i.e. pH 7.0, temperature 30° C., and 3 minutes reaction time) catalyses the conversion of 1 μmol hydrogen peroxide per minute. The activity is determined using an assay based on ABTS® (2, 2'-azinobis(3-ethylbenzothiazoline-6-sulfonate)) as the chromophore, the greenish-blue colour produced being photometered at 418 nm.

A folder AF 279/2 describing this analytical method is available upon request to Novo Nordisk A/S, Denmark, which folder is hereby included by reference.

Wood Composite or Laminated Wood Products

The method of the invention may be used for the preparation of a glue or an active binder, which glue or active binder may be used per se in the manufacture of wood composites, or in the manufacture of laminated wood products.

Alternatively, the method may be used as an integrated part of the manufacture of wood composites, or in the manufacture of laminated wood products, e.g. by spraying.

In particular, the method finds application in the manufacture of wood composite or laminated wood commonly used in construction, where a high physical strength is generally important. Examples of wood composites are fibre board made from wood fibres, and particle boards (chipboards) made from wood particles. Examples of laminated wood products are plywood or laminated beams.

A method of producing wood composites may include binding the material (e.g. wood fibres or wood particles) with the binder prepared by the method of the invention and pressing, usually with heating.

After the enzyme treatment water is drained off, e.g. by screening or squeezing, to obtain a "fleece" which is sufficiently solid for further handling.

The fleece is pressed at a temperature and time sufficient to effect enzymatic polymerization of lignin in the fibre material and obtain a final product of the desired density and physical strength. The pressing may be cold (e.g. 40°–70° C. for 2–48 hours) or hot (e.g. 150°–200° C. for 2–20 minutes). A conventional press for production of wood composites may be used.

The following examples further illustrate the present invention, and they are not intended to be in any way limiting to the scope of the invention as claimed.

EXAMPLE 1

The lignin used in this Example was Indulin™. The enzyme used was SP 502, a liquid peroxidase preparation having an activity of 10,000 PODU/g, available from Novo Nordisk A/S, Denmark. The enzyme preparation was diluted with buffer to an activity of 1000 PODU/ml. Samples were prepared the following way.

Suspensions of 25 mg/ml of lignin in 0.4M Britton & Robinson buffer were heated for 15 minutes at 80° C. by shaking the samples on a water bath. The samples were centrifuged for 10 minutes at 2000 r.p.m., and the supernatant filtered, thereby obtaining a lignin solution.

An enzyme blank was prepared by mixing 1200 µl of enzyme solution (1000 PODU/ml) with 1800 µl of Britton & Robinson buffer, followed by addition of $H_2O_2$ to an amount of 10 mM in the assay.

A blank was prepared by mixing 1800 µl of the above obtained lignin solution with 1200 of Britton & Robinson buffer, followed by addition of $H_2O_2$ to an amount of 10 mM in the assay.

Tests were prepared using 1200 µl of enzyme solution (1000 PODU/ml) with 1800 µl of the above obtained lignin solution, followed by addition of $H_2O_2$ to an amount of 10 mM in the assay.

The tests were performed at pH 7.2, pH 8.6, and pH 9.5, respectively. Samples were collected after 5 minutes, 10 minutes, and 15 minutes, respectively, and the tests were performed at room temperature (20° C.) unless otherwise stated.

Average molecular weight determination was determined using HPLC, as a GPC-method.

Figure 1B:
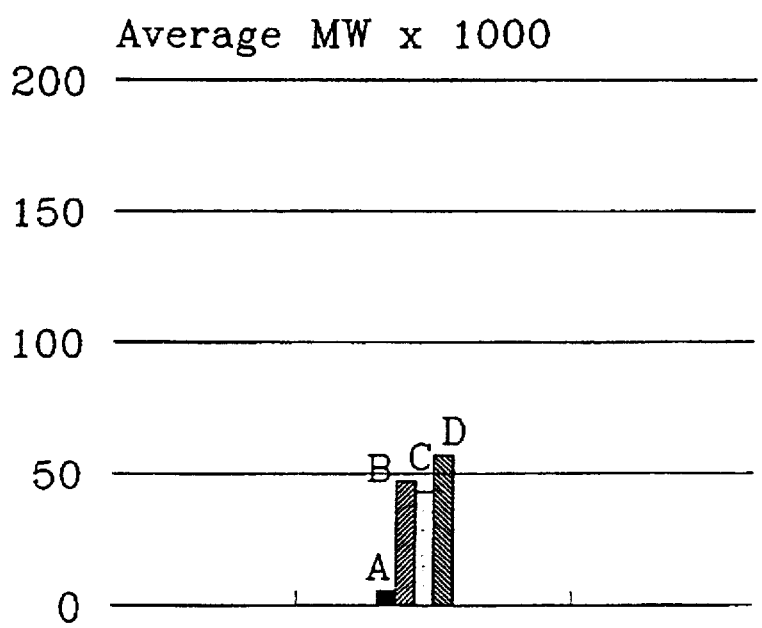
Figure 1C:
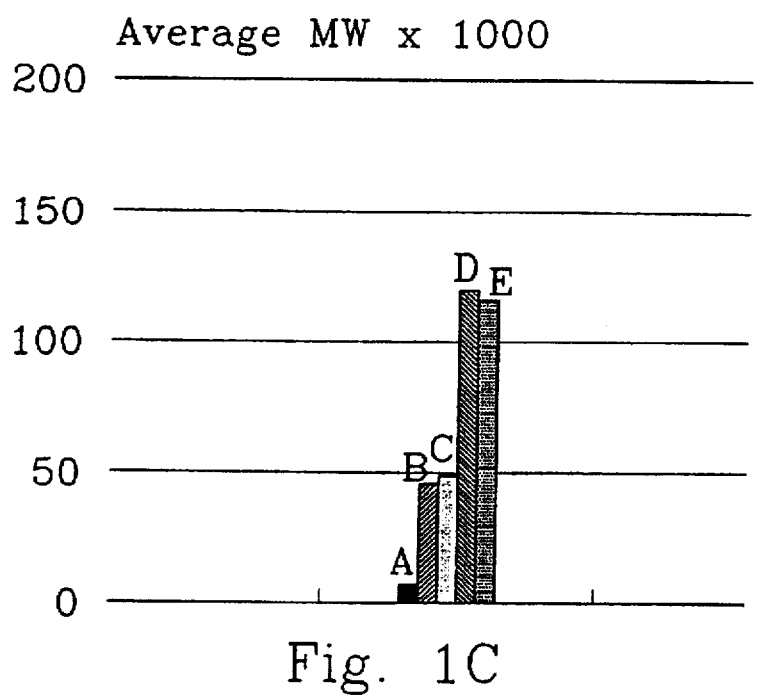
Figure 1D:
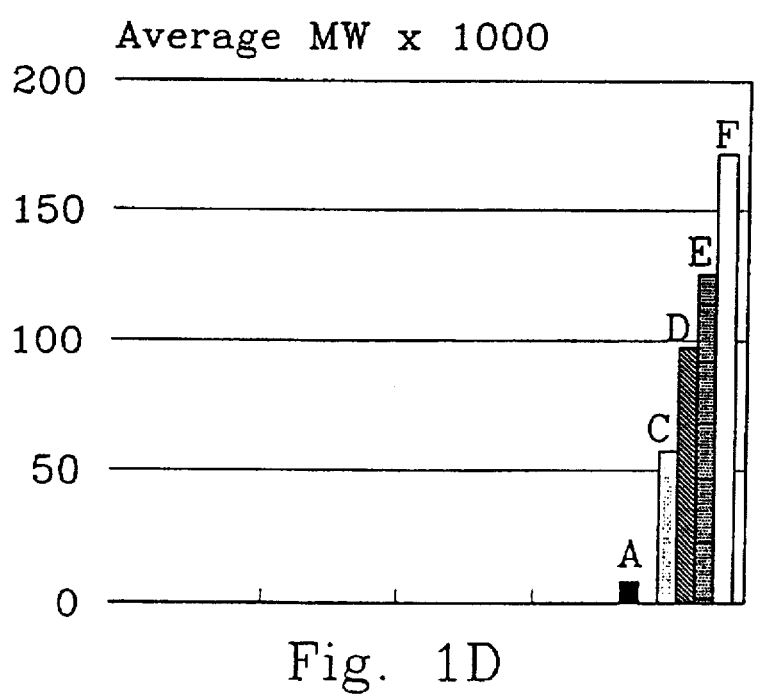
Figure 2A:
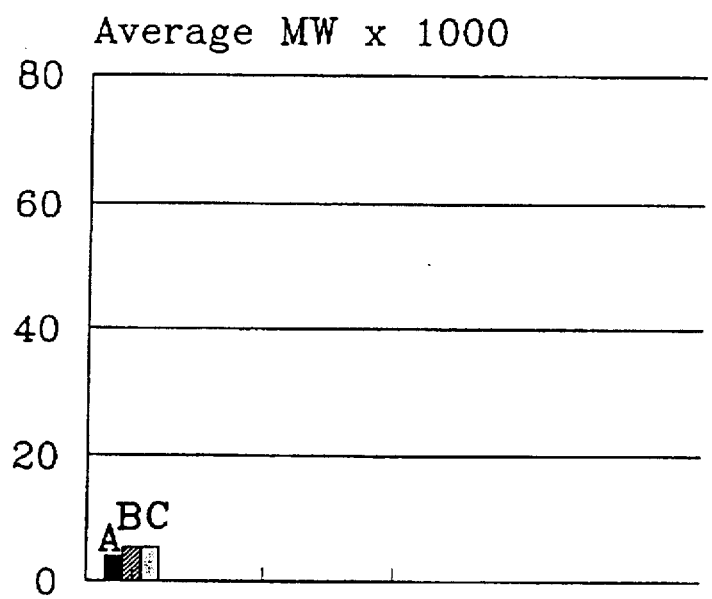
FIGS. 2A–2D shows optimization of enzyme dosage for polymerization of Indulin™, determined by average molecular weight (MW×1000), by use of SP 502™ and 10 mM $H_2O_2$ (A Start; B 5 min; C 2×10 mM $H_2O_2$)
Figure 2B:
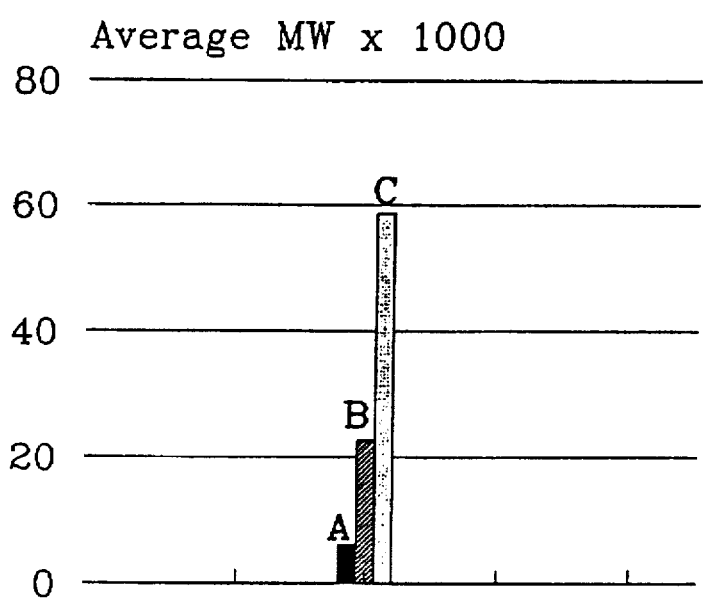
Figure 2C:
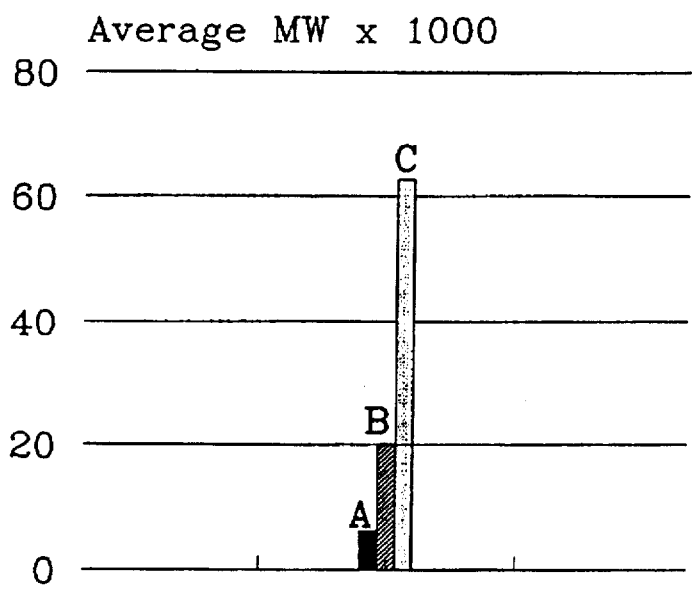
Figure 2D:
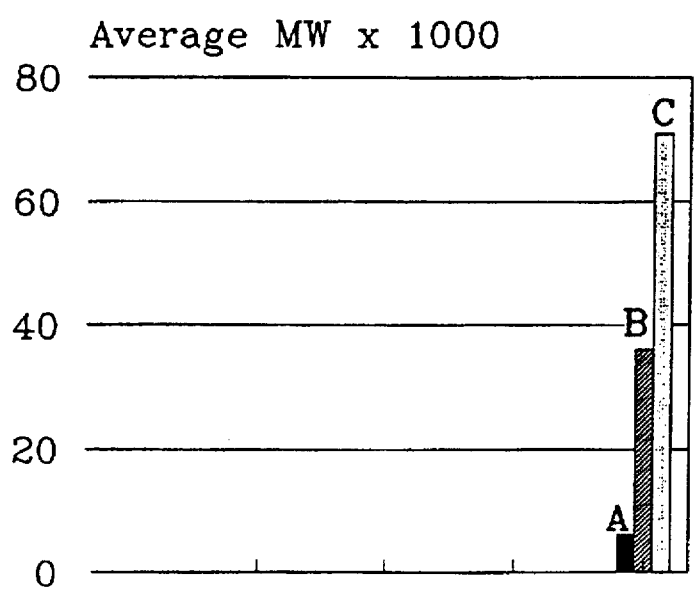
Figure 3A:
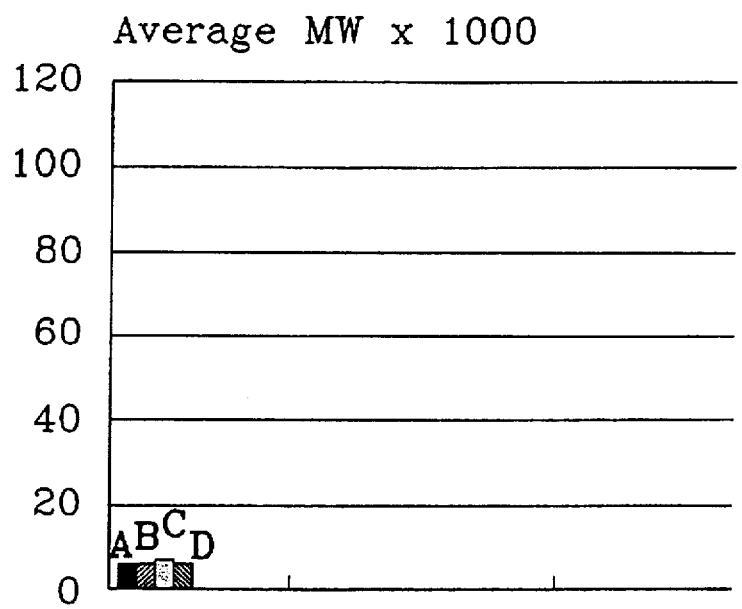
FIGS. 3A–3D shows polymerization of Indulin™ at various temperatures, determined by average molecular weight (MW×1000), by use of SP 502™ and 3×10 mM $H_2O_2$ (A 400 PODU/ml, 20° C.; B 400 PODU/ml, 40° C.; C 4000 PODU/ml, 20° C.; D PODU/ml, 40° C.)
Figure 3B:
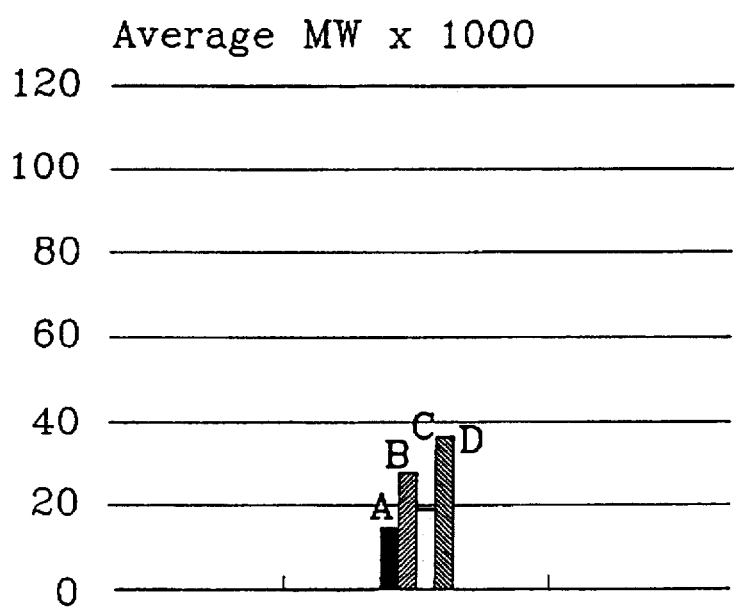
Figure 3C:
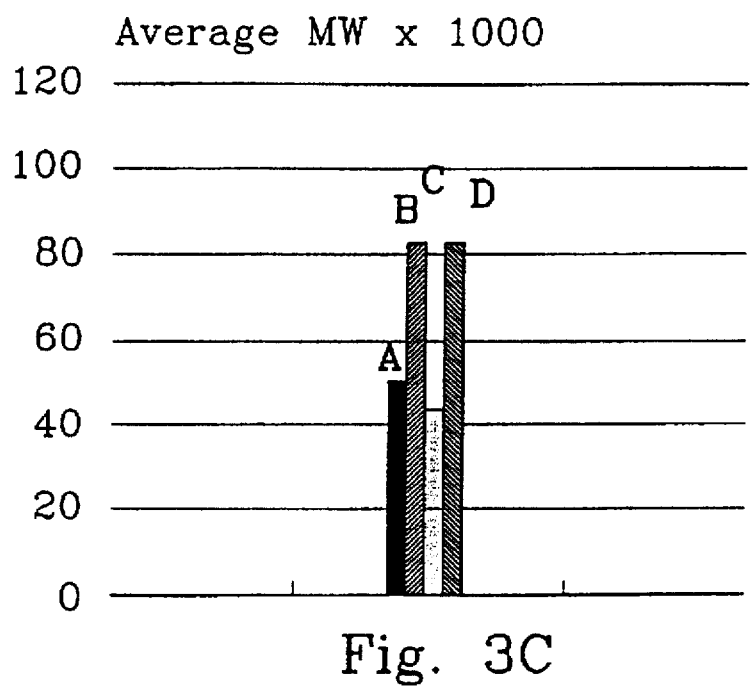
Figure 3D:
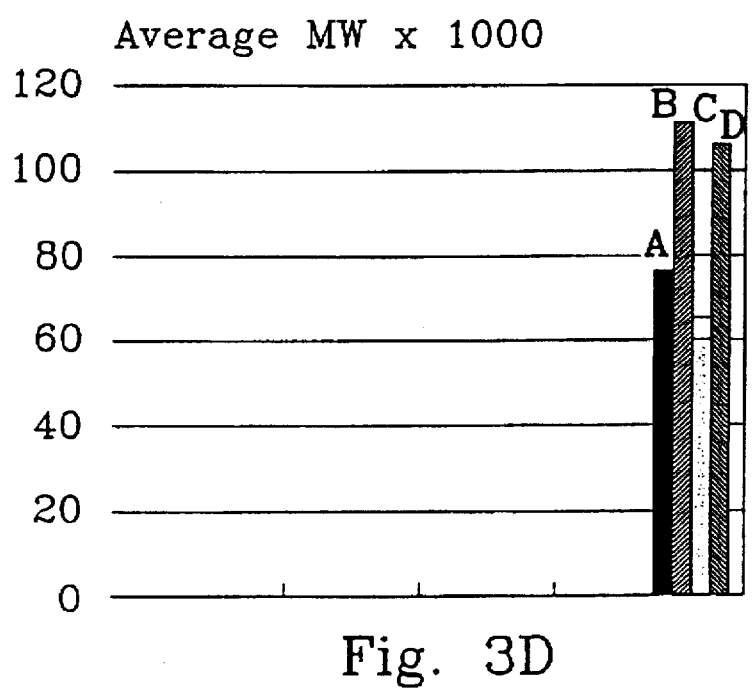
Figure 4A:
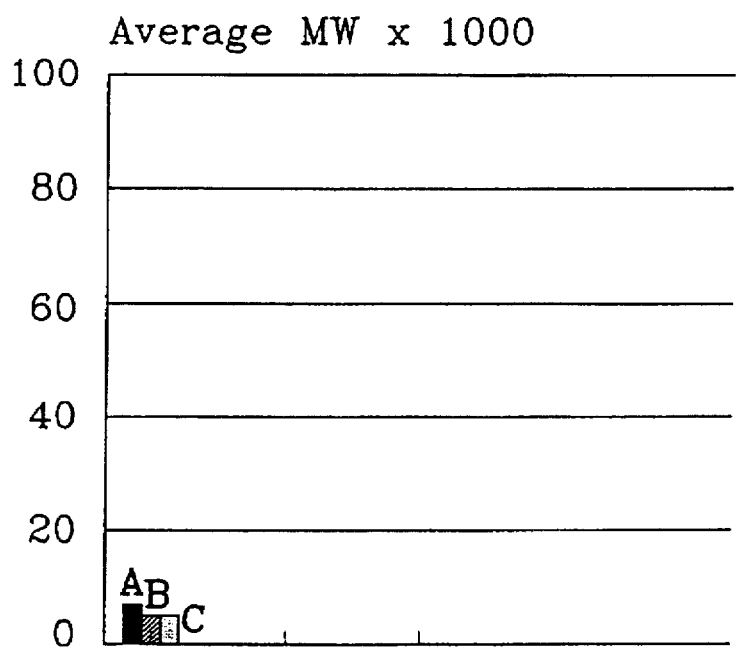
FIGS. 4A–4D shows polymerization of Indulin™ at various pH, determined by average molecular weight (MW× 1000), by use of SP 502™ (400 PODU/ml) and 3×10 mM $H_2O_2$ (A pH 7.2; B pH 8.6; C pH 9.5)
Figure 4B:
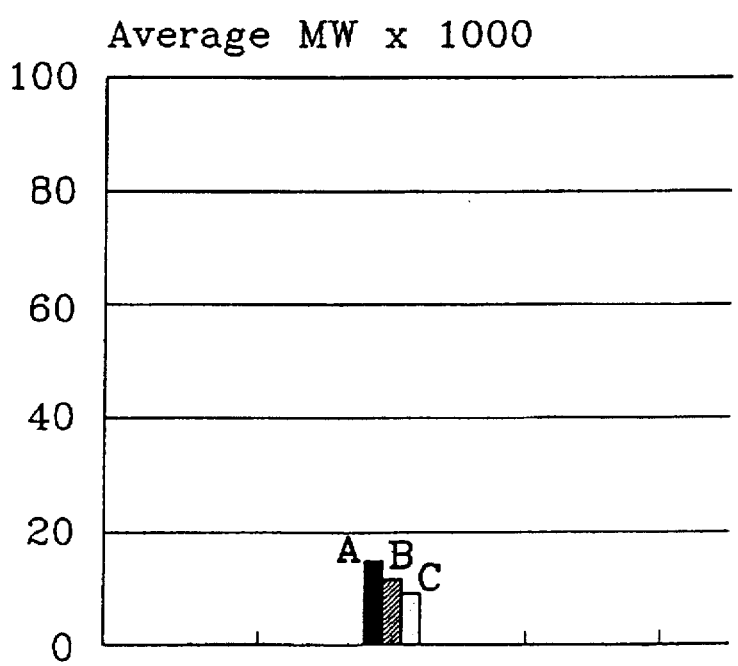
Figure 4C:
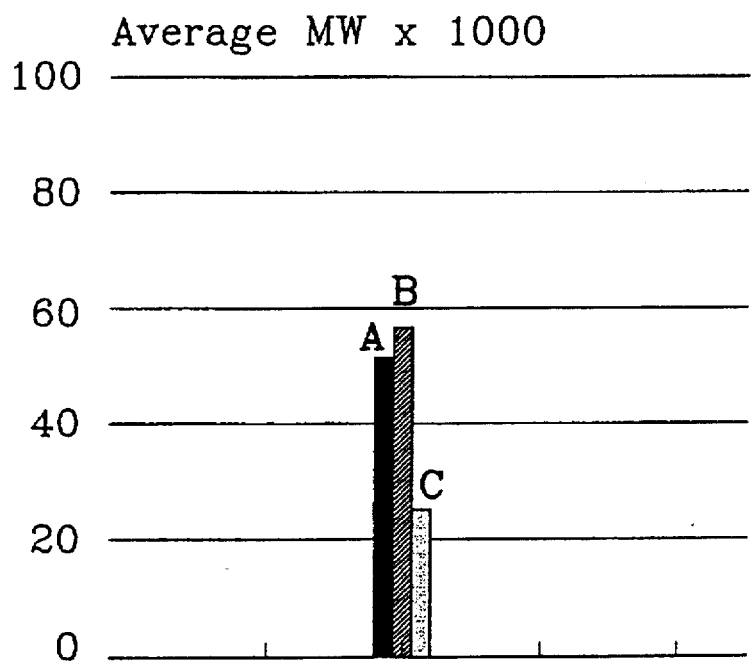
Figure 4D:
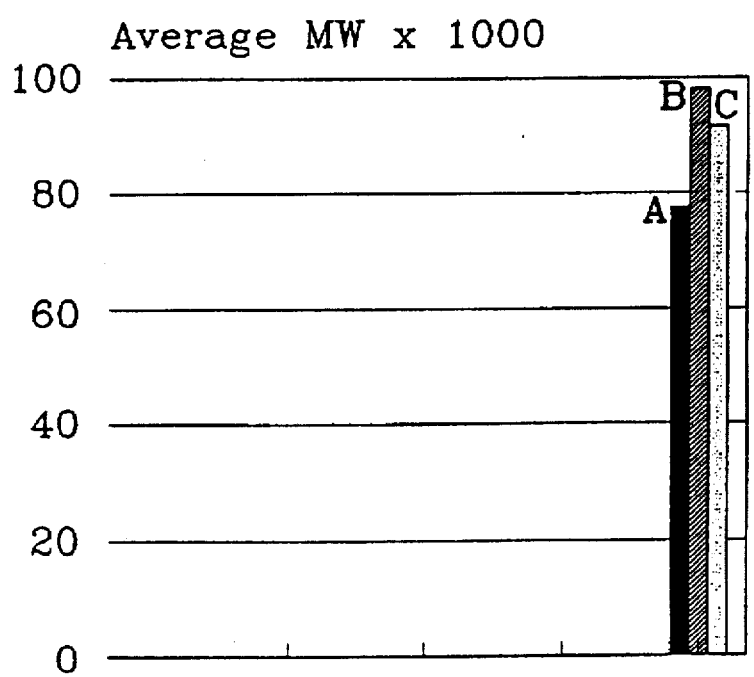
Figure 5A:
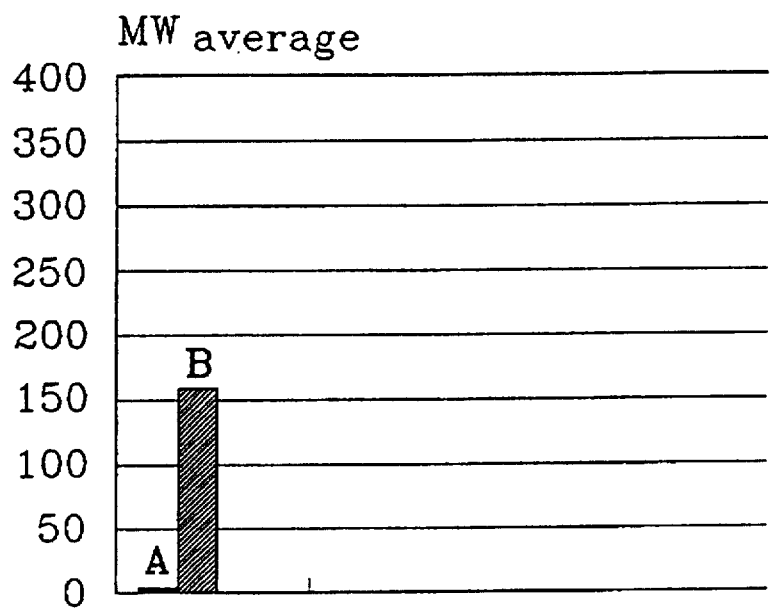
FIGS. 5A–5F shows polymerization of various lignins determined by average molecular weight after treatment for 30 minutes with SP 502™ (4000 PODU/ml) (A Blank test; B Sample)
Figure 5B:
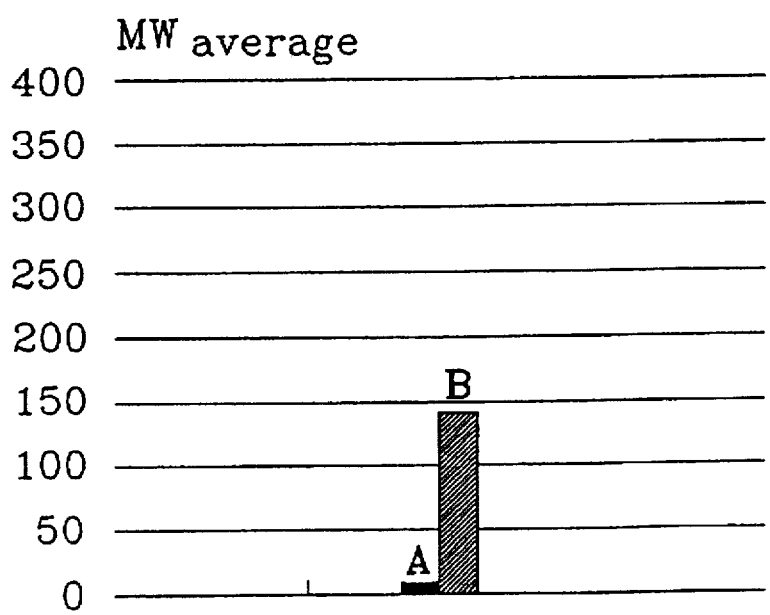
Figure 5C:
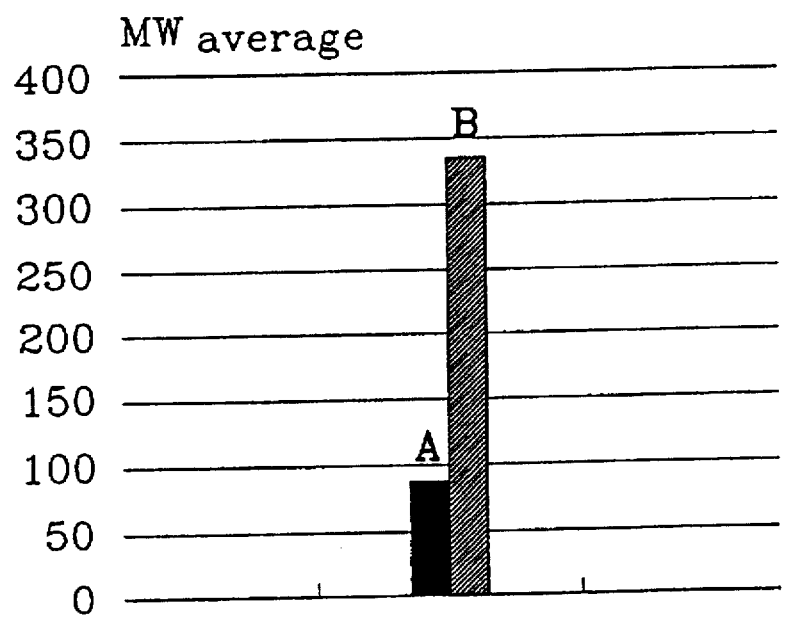
Figure 5D:
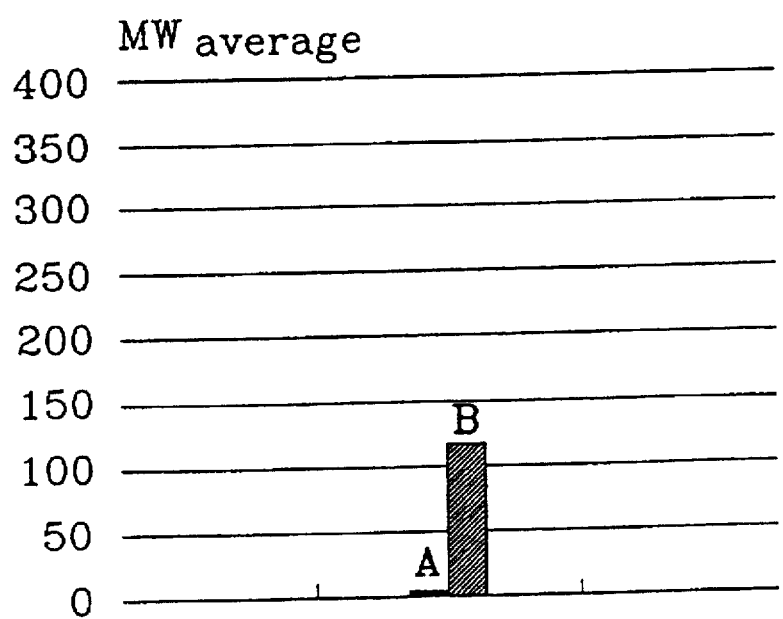
Figure 5E:
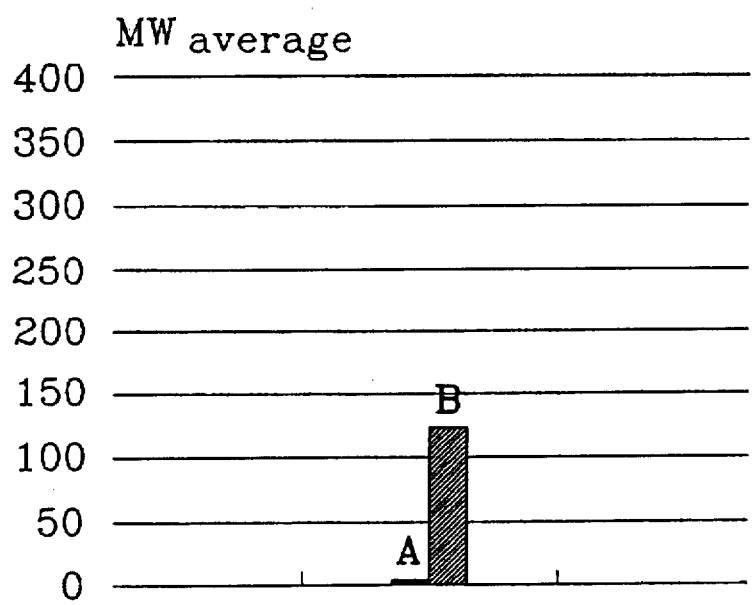
Figure 5F:
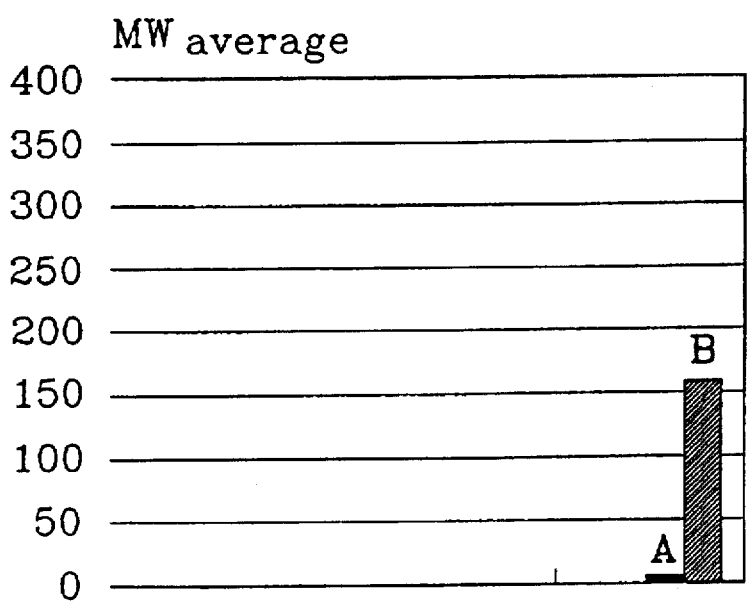

The results of these optimization experiments are presented in the appended FIGS. 1–5.

FIG. 1 shows that a "conventional" polymerization reaction is able to increase the average molecular weight (AMW) to appr. 40,000. If additional enzyme is added (after 5 minutes of incubation) the AMW is increased to appr. 50,000. If additional hydrogen peroxide is added (after 30 minutes of incubation) AMW increases to appr. 125,000, and if hydrogen peroxide is added twice (after 30 and 60 minutes, respectively) an AMW of as high as appr. 175,000 is achieved, which is appr. four times the AMW of a "normal" polymerization.

FIG. 2 shows optimization of enzyme dosage. It appears that the polymerization reaction increases with increased enzyme dosage, but optimum performance is within the range 10–40 PODU/ml. It also shows the effect of additional hydrogen peroxide, added after 5 minutes of incubation. AMW are two-three fold increased.

FIG. 3 shows polymerization at 20° and 40° C., respectively.

FIG. 4 shows polymerization at pH 7.2, 8.6, and 9.5, respectively. At pH 7.2, 8.6 and 9.5 the degree of polymerization after 15 minutes is higher for the reactions performed at pH 8.2 and 9.5 than at pH 7.2. At pH 7.2 the polymerization starts immediately, but at pH 8.2 and 9.5 the polymerization is relatively slow for the first 5 and 10 minutes, respectively, whereafter the reaction velocity is much faster than at pH 7.2.

FIG. 5 shows AMW after 30 minutes of polymerization of various lignins.

EXAMPLE 2

The lignin used in this Example was Black Liquor™. The enzyme used was SP 502, a liquid peroxidase preparation having an activity of 10,000 PODU/g, available from Novo Nordisk A/S, Denmark. The enzyme preparation was diluted with buffer to an activity of 1000 PODU/ml. Samples were prepared the following way.

For the first test a solution containing 14.0 mg/ml of lignin in a buffer (Milli-Q™), pH 10.8 was prepared.

For the second test a solution containing 14.2 mg/m of lignin in a phosphate buffer, pH 8.2, was prepared.

For the third test a solution containing 13.8 mg/ml of lignin in a phosphate buffer, pH 10.7, was prepared.

For the fourth test a solution containing 12.9 mg/ml of lignin in a phosphate buffer, pH 9.6, was prepared.

To 1.8 ml of the above lignin solutions, 1.2 ml of enzyme solution diluted to 1000 PODU/ml with buffer were added. The test was incubated for 5, 10, and 15 minutes, respectively. After 5 and 10 minutes, respectively, 50 µl of 610 mM hydrogen peroxide were added.

Average molecular weight determination was determined using HPLC, as a GPC-method.

The results of these tests are presented in Table 1, below.

TABLE 1

| | Polymerization of Black Liquor ™ Average molecular weight Blind Incubation time | | | |
|---|---|---|---|---|
| | 5 min.* | 10 min.* | 15 min | |
| Test 1 | 13,500 | 15,700 | 18,800 | 18,400 |
| Test 2 | 13,200 | 63,400 | 238,000 | 269,000 |
| Test 3 | 14,200 | 89,000 | 306,000 | 389,000 |
| Test 4 | 18,900 | 93,000 | 289,000 | 358,000 |

*Hydrogen peroxide added

I claim:

1. A method of enzymatic polymerization and modification of non-sulfonated lignin or non-sulfonated lignin containing material by treatment with a peroxidase, wherein, the enzymatic polymerization is performed at alkaline pH values, wherein hydrogen peroxide is added under controlled conditions in which the hydrogen peroxide is not introduced all at once, and polymerization is performed in the absence of any organic solvents.

2. The method according to claim 1, in which the enzymatic polymerization is performed at a pH in the range of from 7–11.

3. The method of claim 1, in which the peroxidase is derived from Coprinus.

4. The method of claim 1, wherein the peroxidase dosage is in the range of 1–10,000 PODU per g of lignin.

5. A method of claim 1, in which the addition of hydrogen peroxide is administrated in a manner that keeps pace with said hydrogen peroxide consumption.

6. The method of claim 5, in which hydrogen peroxide is added discretely or continuously, either in an initial stage of the incubation period, or equally throughout the incubation period.

7. The method of claim 5, in which the addition of hydrogen peroxide is conducted manually or automatically, e.g. by use of a pump.

8. The method of claim 5, in which hydrogen peroxide is added enzymatically using a hydrogen peroxide generating enzyme in the presence of its substrate.

9. A method of claim 1, in which a hydrogen peroxide concentration in the range of 0.01–20 mM.

10. The method of claim 1, which method further comprises the addition of a chemical polymerizing agent.

11. The method of claim 10, wherein the second chemical polymerizing agent is PMDI.

* * * * *